Nov. 16, 1937.  B. BANNISTER  2,099,459
APPARATUS FOR MAKING PIPES AND TUBES
Filed Nov. 27, 1935　　9 Sheets-Sheet 1
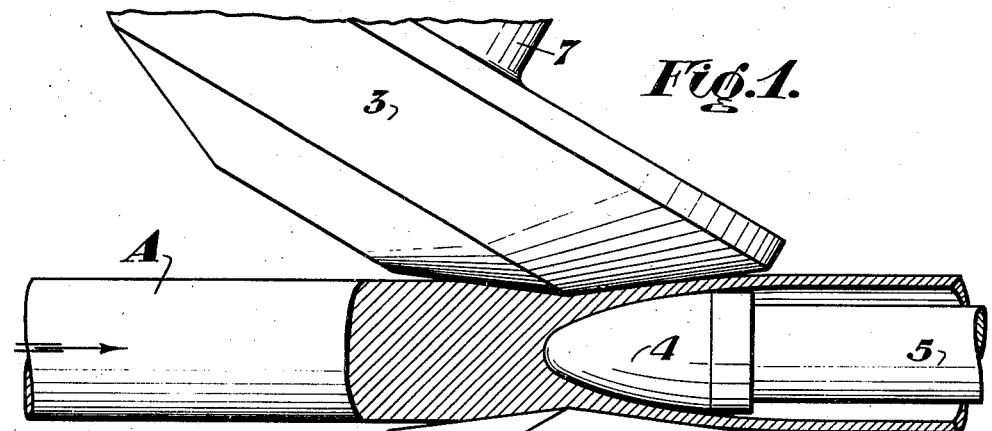
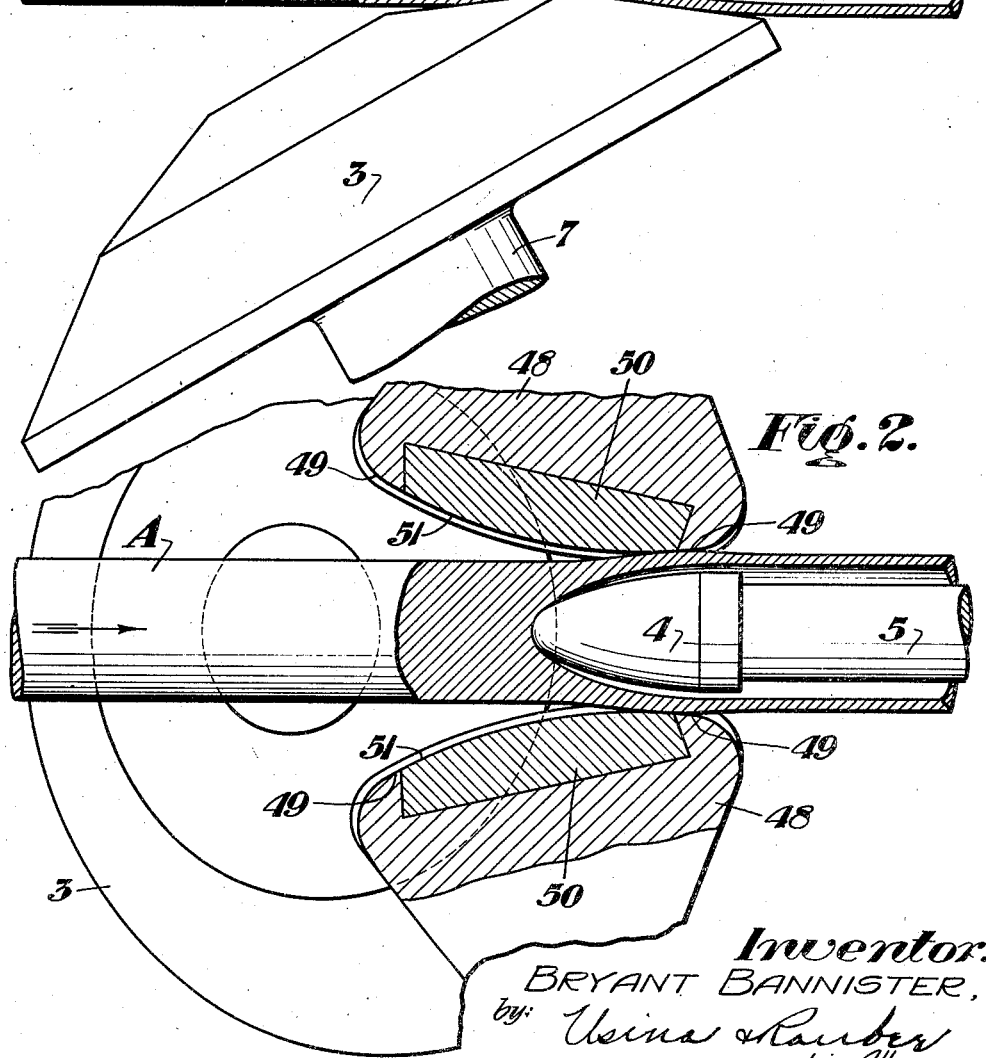
Inventor:
BRYANT BANNISTER,
by: Usina & Rauber
his Attorneys.

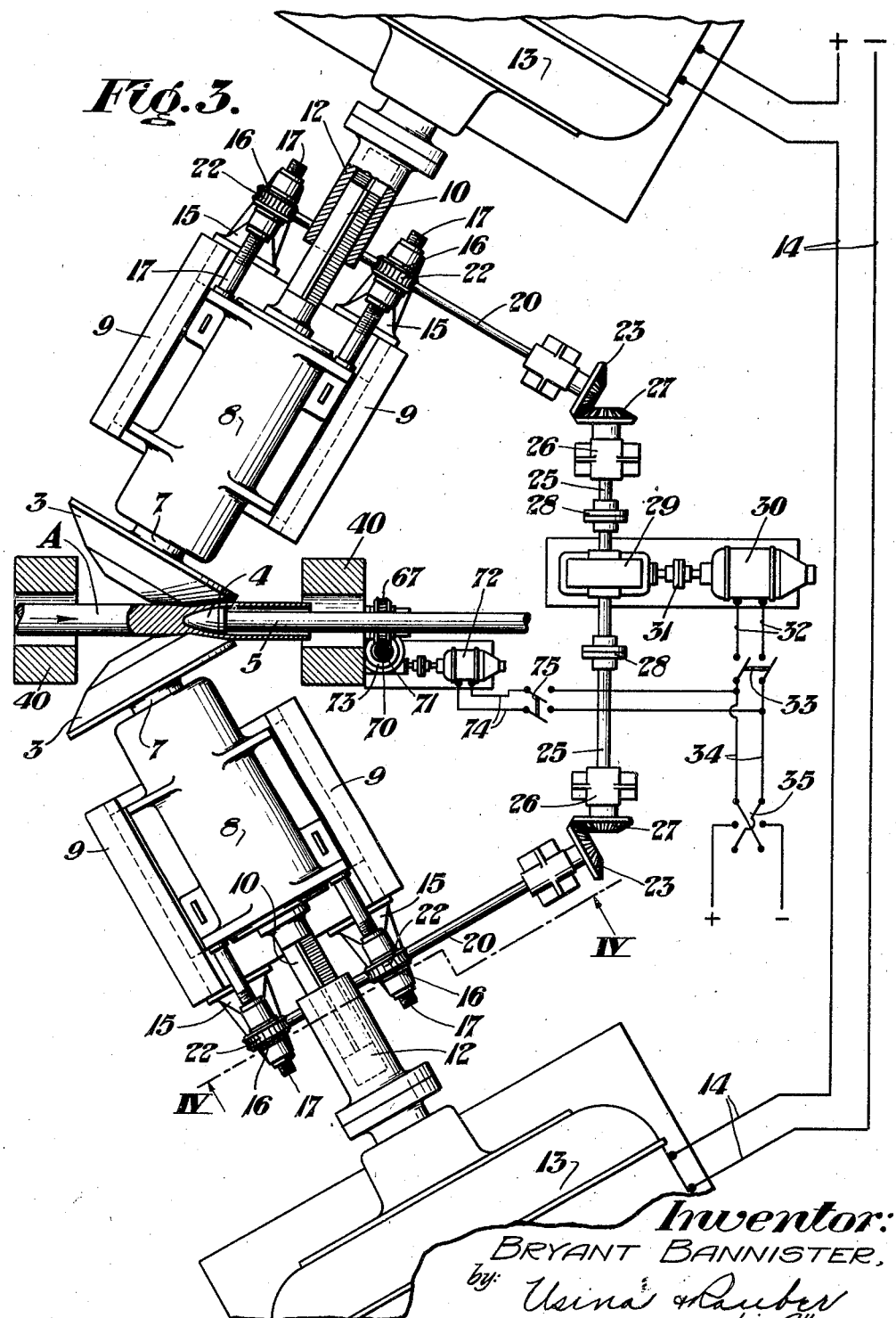

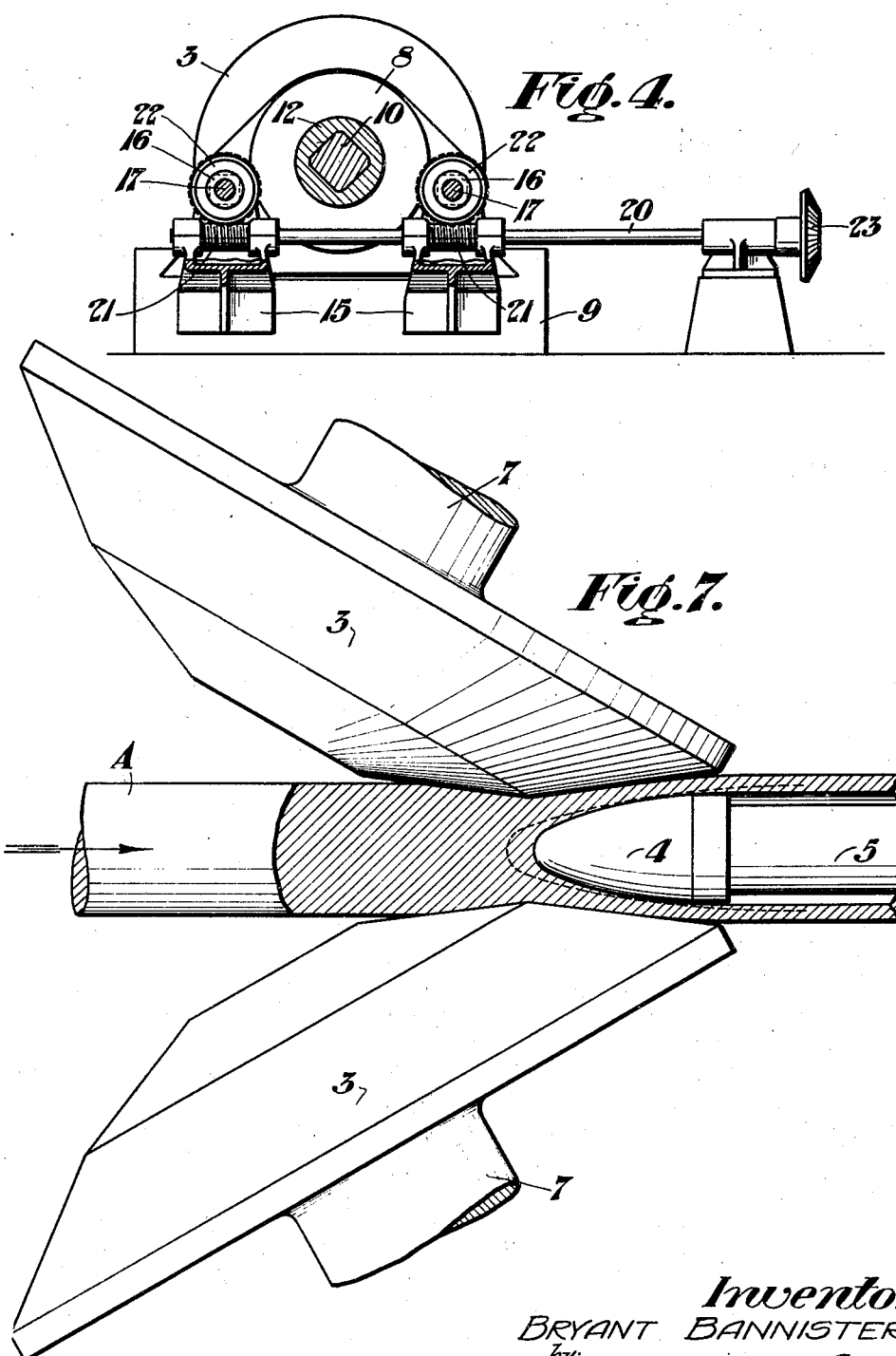

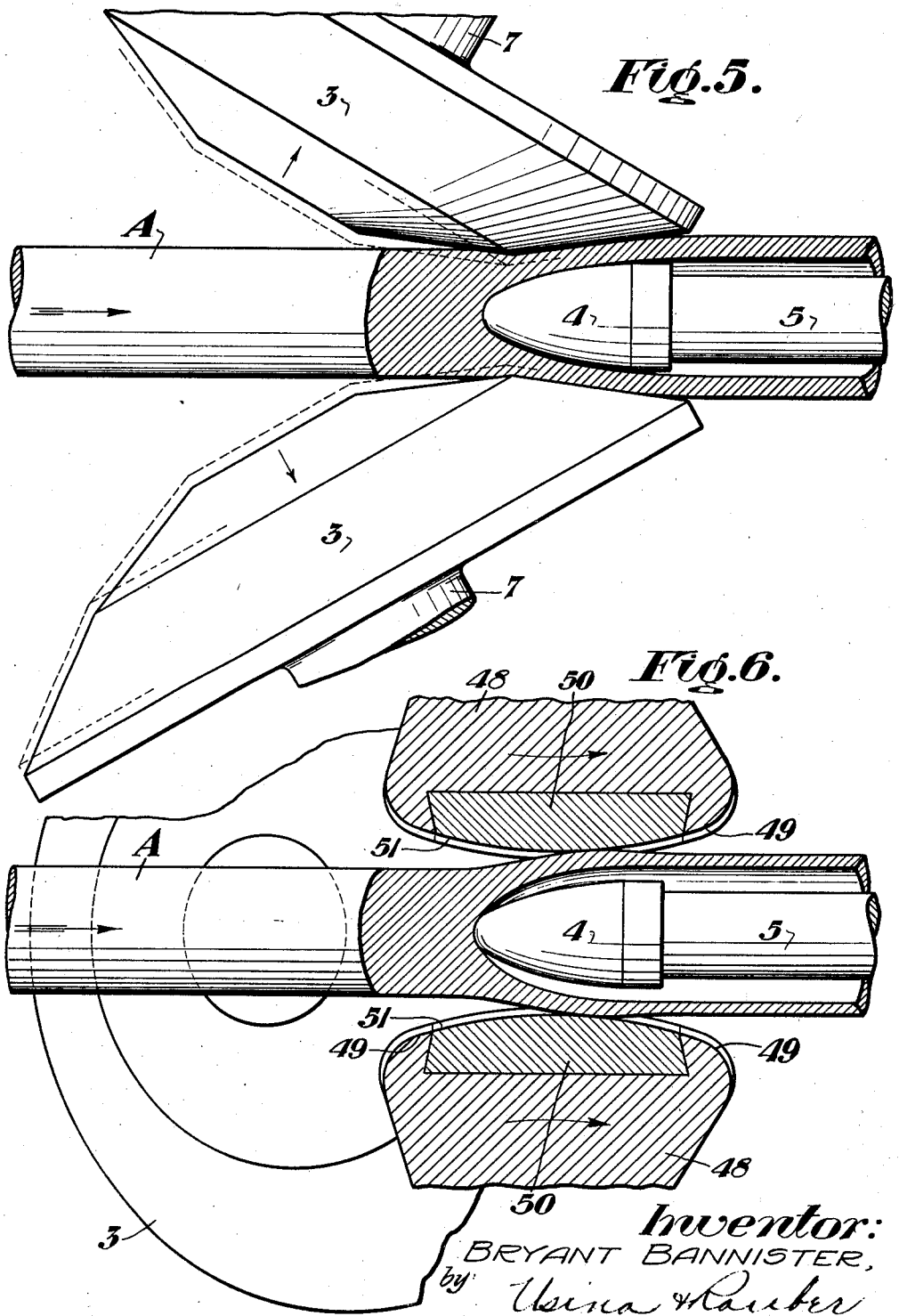

Nov. 16, 1937.  B. BANNISTER  2,099,459
APPARATUS FOR MAKING PIPES AND TUBES
Filed Nov. 27, 1935  9 Sheets-Sheet 5
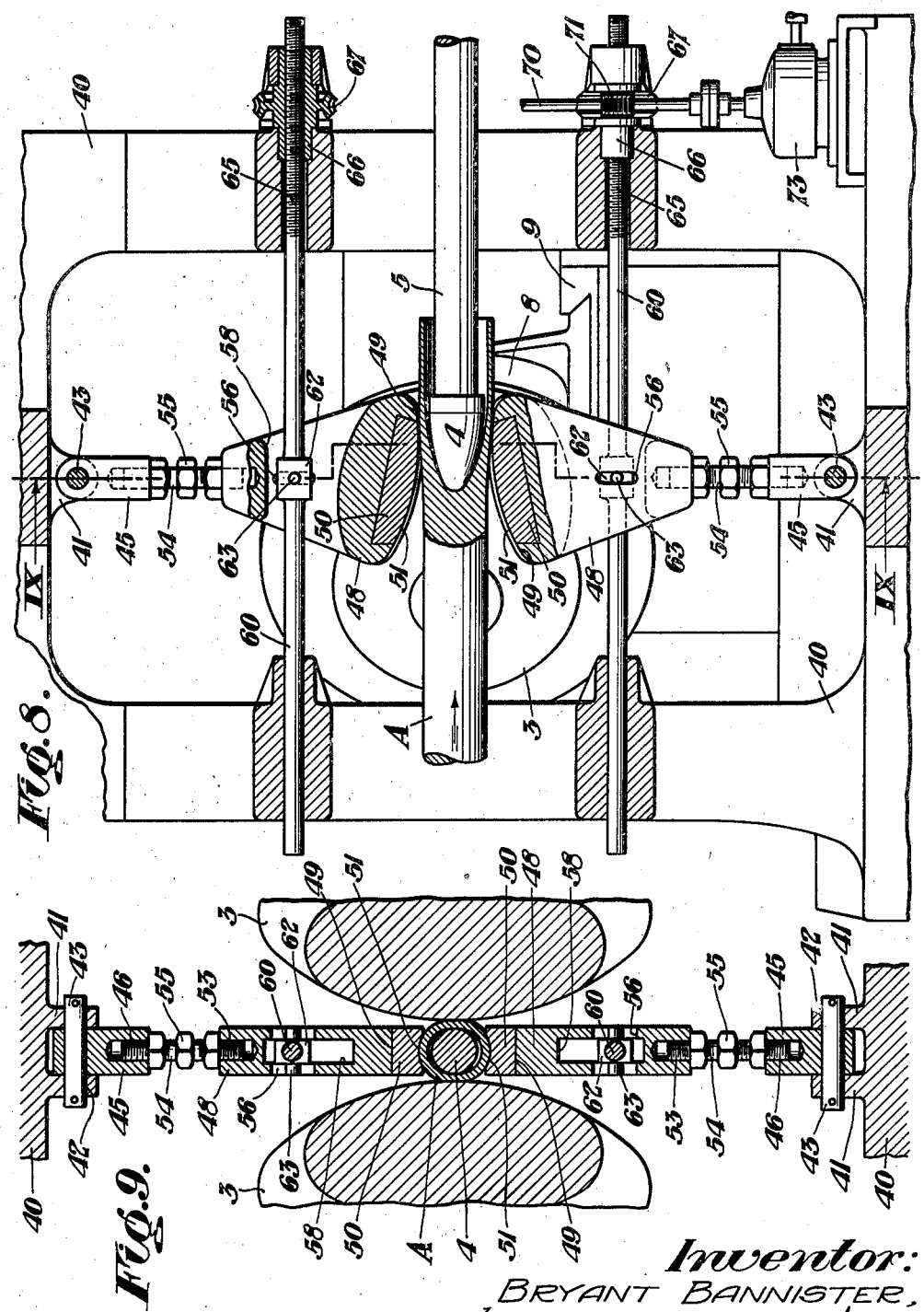
Inventor:
BRYANT BANNISTER,
by: Usina & Rauber
his Attorneys.

Nov. 16, 1937.  B. BANNISTER  2,099,459
APPARATUS FOR MAKING PIPES AND TUBES
Filed Nov. 27, 1935  9 Sheets-Sheet 6

Inventor:
BRYANT BANNISTER,
by: Usina & Rauber
his Attorneys.

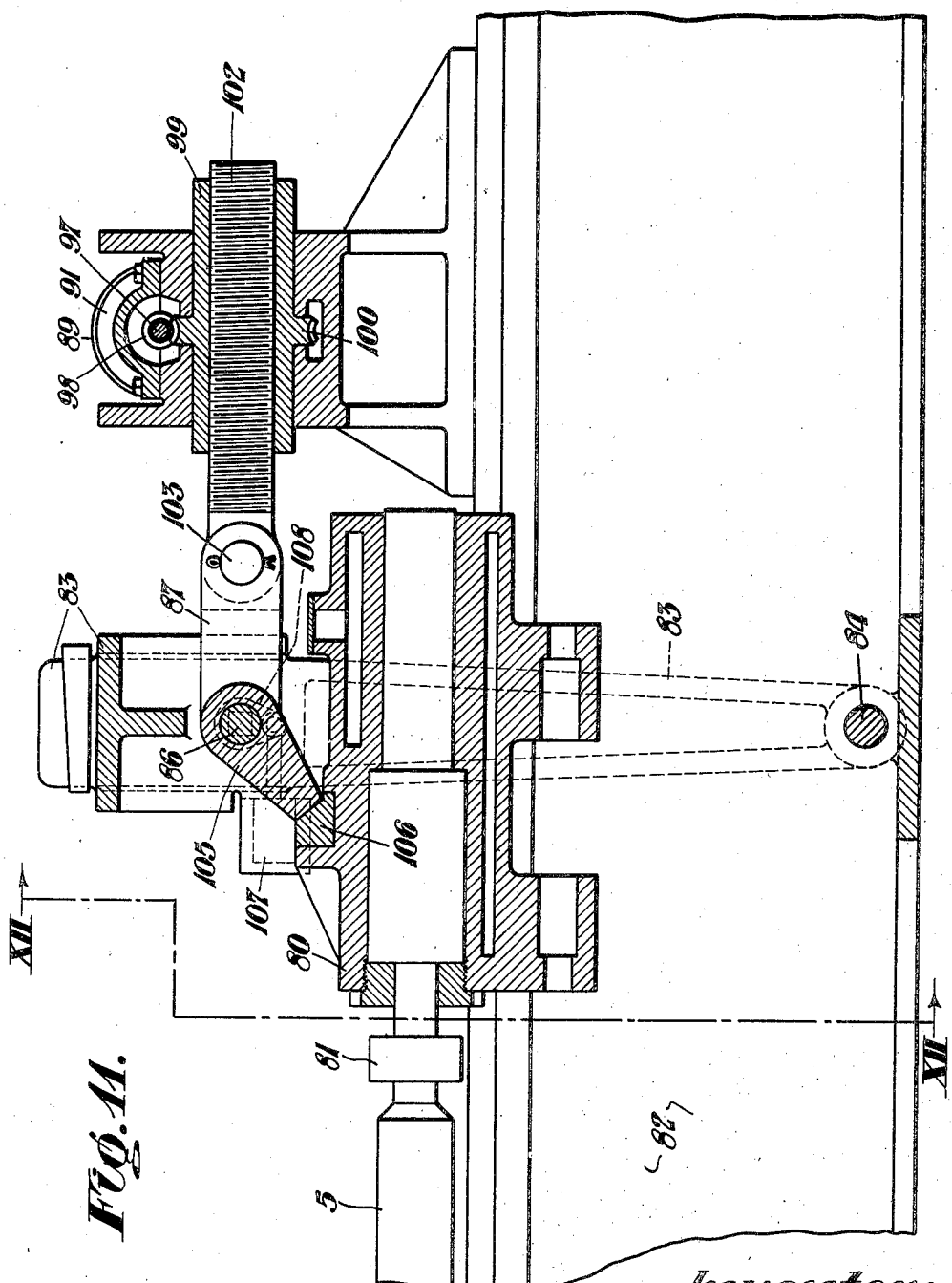

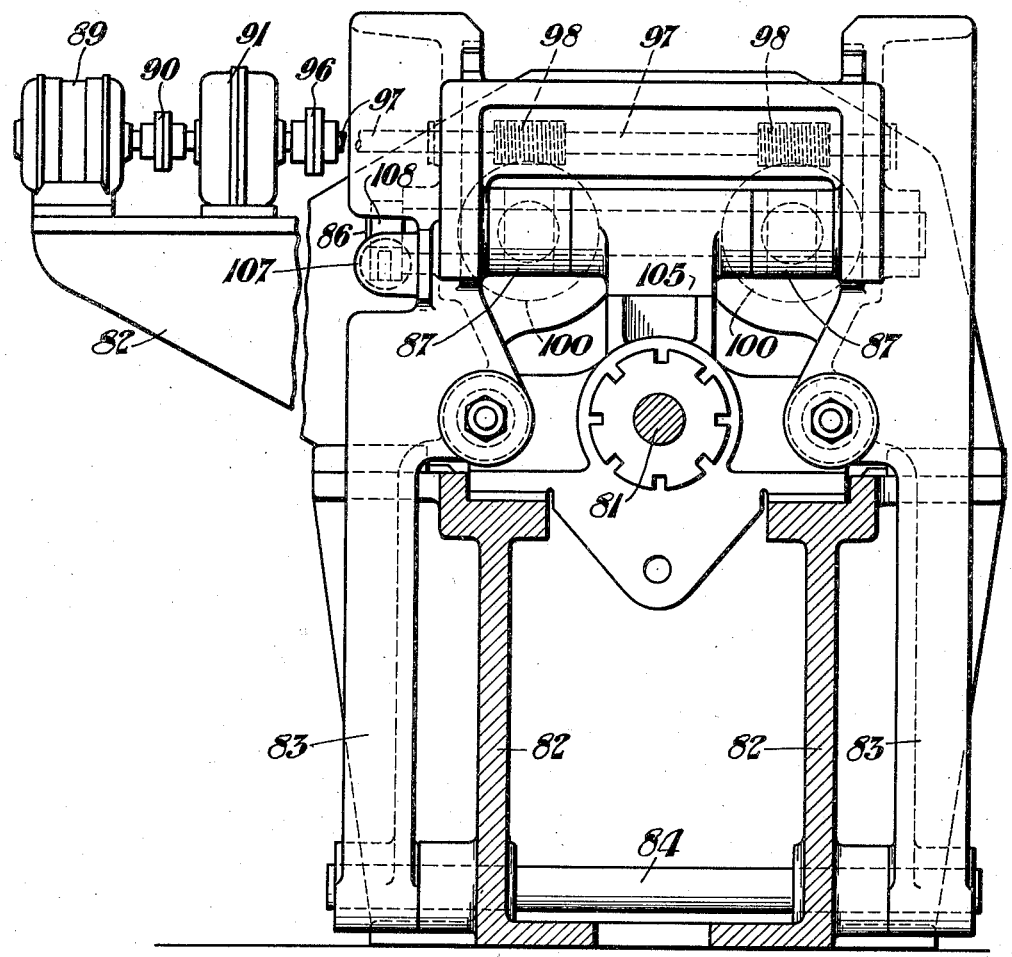

Nov. 16, 1937. B. BANNISTER 2,099,459
APPARATUS FOR MAKING PIPES AND TUBES
Filed Nov. 27, 1935 9 Sheets-Sheet 9
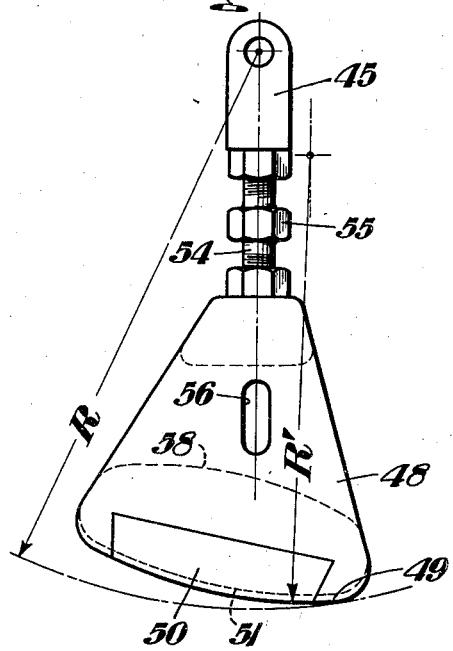
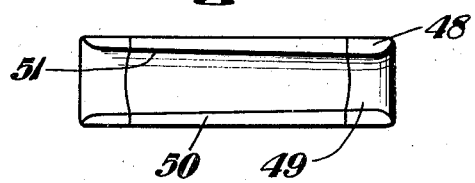
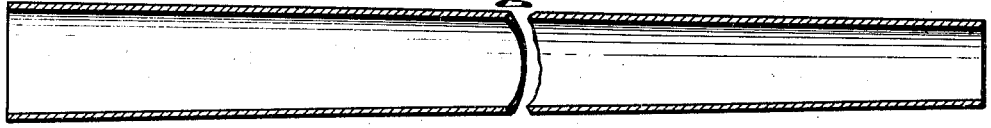
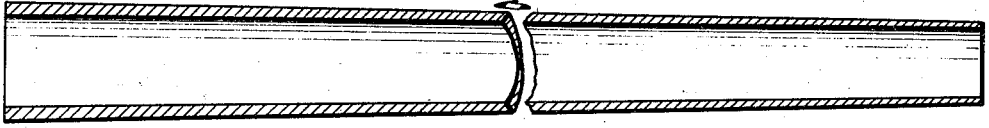
Inventor:
BRYANT BANNISTER,
by: Usina & Rauber
his Attorneys.

Patented Nov. 16, 1937

2,099,459

UNITED STATES PATENT OFFICE 2,099,459

APPARATUS FOR MAKING PIPES AND TUBES

Bryant Bannister, Mount Lebanon, Pa., assignor to National Tube Company, a corporation of New Jersey Application November 27, 1935, Serial No. 51,901

2 Claims. (Cl. 80—13)

This invention relates to the manufacture of pipes and tubes, and more particularly to what is known as "seamless" practice.

In the manufacture of pipes and tubes from solid "rounds", the latter are heated to a forging temperature and initially pierced to form a relatively thick-walled tubular work-piece. This thick-walled tubular work-piece is then changed in length, diameter or wall-thickness, or all three of these dimensional characteristics, depending upon the use for which it is intended. These subsequent operations are known in the art as "elongating", "expanding", "sinking", etc.

In addition to the many uses of finished pipes and tubes of substantially unvarying dimensions, there is a vast field of use for pipes and tubes which vary throughout their length in diameters and wall-thickness. This type of tapered product has, heretofore, been manufactured only with considerable difficulty and expense.

The present invention concerns itself with the provision of a novel apparatus for efficiently and inexpensively making pipes and tubes having varying internal and/or external diameters. That is to say, I may produce a tubular work-piece having varying internal and external diameters with substantially constant wall-thickness, or I may change any two or all three of these factors. More specifically, the following results are readily obtained:

a. Tubular work-piece having varying internal diameter with outside diameter unvarying, whereby wall-thickness varies.

b. Tubular work-piece having varying external diameter with internal diameter unvarying, whereby wall-thickness varies.

c. Tubular work-piece having proportionately varying internal and external diameters, whereby wall-thickness is unvaried.

d. Tubular work-piece having varying internal and external diameters, and also varying wall-thickness.

The variance in the dimensional characteristics of the section of the work-piece may extend throughout the length of the same or to limited areas thereof and, if desired, the results may be effected from a solid "round" in but a single operation.

In order to fully explain the many advantages of the present invention, the following brief reference to certain specific aspects of "seamless" practice is believed necessary.

The operation of "piercing" is carried out by the use of a plurality of power-driven metal-working rolls and an intermediately disposed piercing point, or mandrel. The subsequent operations are also carried out by the use of a plurality of power-driven metal-working rolls and, in most cases, an intermediately disposed mandrel of suitable design.

In most cases the metal-working rolls define a metal "pass" having convergent and divergent portions which adjoin at what is known as the "gorge" or most constricted area. While being acted upon by these metal-working rolls, there is a great tendency on the part of the metal of the work-piece to move from the axis of the pass in a lateral direction and, due to its plastic condition, assume an oval formation. This distortion, or "ovality", which is assumed by the highly heated metal of the work-piece while intermediate the metal-working rolls, is necessary and therefore cannot be confined too closely; otherwise excessive friction will result in its "freezing" on the mandrel, if such is used. Even if "freezing" is not encountered the metal of the work-piece will be ruptured if its peripheral, or circumferential, growth is too closely restrained. If, on the other hand, no restraint is offered to this peripheral, or circumferential growth, the work-piece will assume an excessive diameter as it progresses through the "gorge" and out of the divergent portion of the "pass". It has therefore been necessary to carefully regulate and restrain the circumferential growth of the work-piece by the use of guide devices which are calculated to effect an accurate control over the resultant outside diameter. These guide devices have another function and that is to elongate the work-piece by reactionary influence with the metal-working rolls provided the former are disposed closer to the horizontal center line of the pass than would be the case were they solely intended to guide.

I have found that by the proper manipulation of these guide devices with respect to the metal-working rolls of the mill during the rolling of a work-piece it can be made to assume a tapering external diameter throughout its length or to limited areas thereof. This control of the external diameter of the work-piece by the manipulation of the guide devices may be exercised alone; in combination with additional control by manipulation of the metal-working rolls; in combination with the control of the internal diameter by manipulation of the mandrel, or in toto. The construction and arrangement of the apparatus for performing these operations is such that any one can be practiced alone, or in combination with any of the others, the result being the ability to obtain any and all of the products hereinbefore identified as a, b, c, and d.

Referring to the drawings:

Figure 1 is a fragmentary plan of a pair of metal-working rolls, an intermediately disposed mandrel, and a work-piece in progress therebetween, the latter being shown partly in section.

Figure 2 is a fragmentary elevation of a part of the mill showing some of the elements thereof, and a portion of the work-piece, in section.

Figure 3 is an extended plan.

Figure 4 is a view on the line IV—IV of Figure 3.

Figure 5 is a view similar to Figure 1, showing the elements in modified relationship.

Figure 6 is a view similar to Figure 2, but showing the elements in modified relationship.

Figure 7 is a view similar to Figure 1, but disclosing the elements in further modified relationship.

Figure 8 is a sectional elevation of a part of the mill.

Figure 9 is a view on the line IX—IX of Figure 8.

Figure 11 is a view on the line XI—XI of Figure 10.

Figure 12 is a view on the line XII—XII of Figure 11.

Figures 13 and 14 are details.

Figure 10:
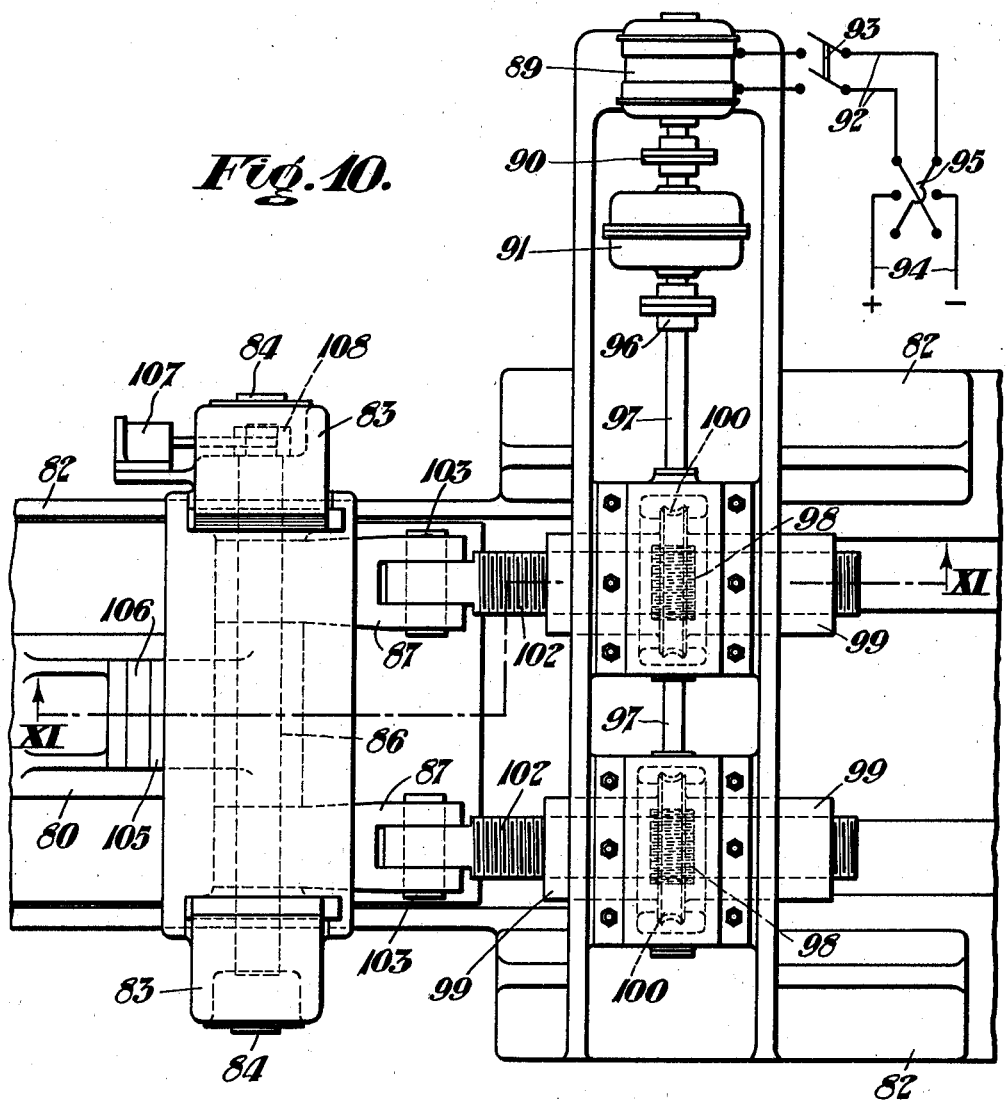
Figure 10 is a fragmentary plan of remotely situated parts of the mill.
Figure 15:

Figures 15, 16, 17, and 18 are sectional views of the products of the mill of the invention.

Referring more particularly to the drawings, the numeral 3 designates a pair of power-driven metal-working rolls, between which there is disposed a mandrel 4, the latter being suitably supported on a mandrel-bar 5. It will be readily understood by those skilled in the art that the type of metal-working rolls (Stiefel) and mandrel (piercing point) illustrated are not those to which the spirit of the invention is confined, but merely exemplify a preferred embodiment. That is to say, any conventional metal-working rolls and mandrel may be used, depending upon requirements and results to be obtained.

The metal-working rolls 3 are carried on shafts 7 which are journaled in suitable housings 8. As shown in Figure 3, each of these housings 8 is slidably mounted on a bed 9. The ends of the shafts 7 which are remote from the metal-working rolls 3 are squared, as shown at 10, in order that each may be operatively engaged by a slip-coupling 12. Each of the slip-couplings 12 is connected to the drive shaft of a suitable electric motor 13. The electric motors 13 are connected to a high voltage power line 14.

Referring again to Figure 3, it will be noted that the rearward end of each of the beds 9 carries a pair of vertical supports 15. An internally-threaded nut 16 is journaled in each of the vertical supports 15 with its bore extending toward the adjacent housing 8. The bore of each of the internally-threaded nuts 16 carries a screw 17 which is connected on one of its ends to the rearward end of one of the housings 8.

A shaft 20 is journaled on and extends between and away from each pair of vertical supports 15. Each of the shafts 20 carries a pair of spaced apart worms 21, and each of the latter meshes with a worm gear 22 which is secured to the adjacent internally-threaded nut 16. This arrangement permits the movement of the metal-working rolls 3 toward and away from the mandrel 4 by the rotation of the shafts 20.

The remotely extending end of each of the shafts 20 carries a bevel gear 23. An independent shaft 25 is journaled, as at 26, adjacent each of the shafts 20, and each of the former carries a bevel gear 27 which meshes with one of the bevel gears 23. The shafts 25 are in alinement and are coupled, as at 28, with a speed reduction unit 29. A reversible electric motor 30 is coupled, as at 31, to the speed reduction unit 29. The motor 30 is connected by wiring 32 and a switch 33 to a low-voltage line 34, in which there is disposed a reversing switch 35.

By the closing of the switch 33 and the operation of the reversing switch 35, the metal-working rolls 3 can be readily adjusted toward and away from the mandrel 4 to effect changes in the wall-thickness of the work-piece A with a corresponding change in its external diameter; but none in its internal diameter. A resultant work-piece of this type is designated in Figure 15 of the drawings.

According to the most important single teaching of the invention, and that which has been previously referred to, the guide devices may be manipulated to obtain a work-piece whose external diameter and internal diameter are varied without changing its wall-thickness. Referring specifically to Figures 8 and 9, the following mechanism may be employed for effecting such manipulation:

A frame 40 is disposed adjacent the mill composed of the metal-working rolls 2 and mandrel 4, and carries a pair of upper and lower alined supports 41 which occupy the vertical plane of the line of "pass". Each pair of these supports 41 is horizontally apertured, as at 42, to receive a pin 43. A swivel-block 45 is carried by each of these pins 43, and each of the fomer is provided with a screw-threaded recess 46.

The guide devices are generally indicated at 48 as comprising a pair of segments that are provided on their adjacent surfaces with curved profiles 49. A heat-and-wear resistant insert 50 is carried on the curved profile 49 of each of the guide devices 48, and each of the former longitudinally taper-grooved, as at 51.

These guide devices 48 are each provided with a threaded recess 53 in their surfaces which are opposite the curved profiles 49 in order that they may each carry a screw 54 which also extends into the threaded recess 46 in one of the swivel-blocks 45. An adjusting nut 55 is rigidly secured to the intermediate portion of each of the screws 54 to enable their easy rotation for the purpose of adjusting the guide devices 48 with respect to the swivel-blocks 45 and accordingly to the horizontal center line of the mill. Each of these guide devices 48 has a vertically slotted aperture 56 extending through it at right angles to the axes of their threaded recesses 53. The guide devices 48 are also provided with apertures 58 which are larger than the vertically slotted apertures 56, and bisect the same.

A pair of shafts 60 is slidably carried by the frame 40, one adjacent each of the guide devices 48. Each of these shafts 60 occupies the vertical center line of the mill and extends through the large aperture 58 in one of the guide devices 48. A block 62 is carried on the intermediate portion of each of the shafts 60 and each carries a pin 63 which extends through the vertically slotted aperture 56 in its respective guide device 48. In this manner the guide devices 48 may be conveniently moved backwardly and forwardly in the pass of the mill by sliding the shafts 60.

One end of each of the shafts 60 is screw-threaded as at 65 and carries an internally threaded sleeve 66. These sleeves 66 are suitably secured against all but rotative movement, and are disposed in the same vertical plane. Each of these sleeves 66 carries a worm-gear 67 for enabling its rotation.

A vertical shaft 70 is suitably journaled on the frame 40 and extended beside the sleeves 66. This vertical shaft 70 carries a pair of worms 71, one being in mesh with each of the worm gears 67, and driven by a reversible electric motor 72 through a speed reducer 73.

The motor 72 is connected by wiring 74 and a switch 75 to the low-voltage line 34 (Figure 3). By this arrangement, the motor 72 may be operated independently of the means for moving the metal-working rolls 3 toward and away from the mandrel 4.

Referring to Figure 13 of the drawings, it will be noted that the guide devices 48 move about the pins 43 on a radius R, while the radius of their curved profiles 49 is considerably shorter as indicated at R'. This permits the effective areas of the heat-and-wear resistant inserts 50 to be adjusted toward and away from the center line of the mill.

In Figure 2 of the drawings the guide devices 48 are shown positioned close to the horizontal center line of the pass, while in Figure 6 they are shown as positioned remotely with respect thereto, whereby in the latter instance the work-piece A will acquire a larger external diameter. For example, the product shown in Figure 17 would result from the left-to-right movement of the guide devices 48 during the progress of the work-piece A through the metal-working rolls 3.

In order to appreciably vary the internal diameter of the work-piece A, whether together with or independently of the external diameter thereof, it is necessary to manipulate the mandrel 4 with respect to the metal-working rolls 3. Referring to Figures 10, 11, and 12, the following mechanism may be employed for effecting such manipulation:

The rearward end of the mandrel-bar 5 is connected to the conventional mandrel-bar carriage 80 through the medium of an equally conventional thrust-coupling 81. This mandrel-bar carriage 80 is reciprocated on the usual bed 82 by mechanism which forms part of every rolling mill of this type. That is to say, as every work-piece is moved between the metal-working rolls 3 and over the mandrel and mandrel plug 4 and 5, respectively, these last two elements must be rearwardly withdrawn before the next work-piece is introduced into the mill.

A support 83 is pivoted, as at 84, to the bed 82, and provided with a horizontally disposed shaft 86 adjacent the upper surface of the mandrel-bar carriage 80. A pair of links 87 is secured to the shaft 86 and operated to move the support 83 about its pivot 84. A reversible electric motor 89 is mounted on the bed 82 and coonnected through a drive-coupling 90, to a speed-reduction unit 91.

The motor 89 is connected by wiring 92 and a switch 93 to a low-voltage line 94 in which there is disposed a reversing switch 95. The driven shaft of the speed-reduction unit 91 is connected, through a drive-coupling 96, to a shaft 97 which is suitably journaled on the bed 82. The shaft 97 carries a pair of spaced apart worms 98. A pair of spaced apart elongated and rotatable sleeves 99 are journaled on the bed 82, one adjacent and at right angles to each of the worms 98 on the shaft 97. A worm gear 100 which meshes with one of the worms 98 is secured to each of the elongated and rotatable sleeves 99.

Each of the elongated and rotatable sleeves 99 is internally threaded and carries a screw 102 which is connected on one of its ends to one of the links 87, as shown at 103. By the closing of the switch 93 and the operation of the reversing switch 95, the support 83 may be moved toward and away from the mandrel-bar carriage 80. This alone has no effect on the mandrel-bar carriage or the mandrel-bar 5 which is connected thereto. Therefore, the mandrel-bar carriage 80 may be suitably and separately operated in the conventional manner. The support 83 does, however, reciprocate the mandrel-bar carriage 80 when it is not separately operated by its own conventional mechanism. This is arranged in the following manner: A latch 105 is secured to the intermediate portion of the horizontal shaft 86 and adapted to make contact, when depending downwardly, with a wear-plate 106 which is mounted on the mandrel-bar carriage 80. The horizontal shaft 86 is partially rotated to bring the latch 105 into and out of engagement with the wear-plate 106 by an air cylinder 107 whose piston-rod is connected to the former by a lever 108. The control for the air cylinder 107, although not shown, is disposed adjacent the other control devices previously described in order that all may be conveniently operated from a control-pulpit.

The effect of permitting the thrust of the work-piece A to slowly withdraw the mandrel 4 with respect to the metal-working rolls 3 is clearly shown in Figure 7. The external diameter of the work-piece A will not change as long as the guide devices 48 remain stationary, but the internal diameter will grow smaller as it moves from left to right. A product of this type is shown in Figure 16 of the drawings.

By properly operating the various control devices shown and described I am able to produce a tubular article which is tapered in any manner whatsoever.

In Figure 18 of the drawings I have illustrated a product which varies in internal and external diameters and also in wall-thickness. In order to effect this result I need only withdraw the mandrel 4 and simultaneously move the guide devices 48 from left to right (or in the direction of the arrows of Figure 6). This I may choose to do either with or without withdrawing one or both of the metal-working rolls 3. The result will, in principle, be the same in either case, and the withdrawal of a metal-working roll or rolls will serve solely to accelerate the change in wall-thickness, assuming, of course, this change has been instituted by the withdrawal of the mandrel.

While I have shown and described one specific embodiment of my invention, it will be understood that I do not wish to be limited exactly thereto, since various modifications may be made without departing from the scope of my invention, as defined by the following claims.

I claim:

1. Apparatus for forming metallic tapered blanks comprising, in combination, a plurality of metal-working rolls which are constructed and arranged to helically advance a work-piece in a continuous manner, and at least one guide member disposed to present its guiding surfaces to that portion of the work-piece which is in the pass of said metal-working rolls, said guide member being capable of only limited swinging movement in a plane through the axis of the work-piece to present different longitudinal portions of its guiding surface thereto, the guiding surface of said guide member having a groove of varying diameter which is longitudinally curved on an arc having its focus offset with respect to the axis about which said guide member swings, thereby producing a guide pass of varying size, and means for imparting swinging movement to said guide member during the passage of the work-piece between said metal-working rolls.

2. Apparatus for making tapered metallic tubular blanks comprising, in combination, a plurality of adjacent metal-working rolls, a mandrel disposed intermediate said metal-working rolls, means for varying the distance between said metal-working rolls, means for varying the distance between said mandrel and said metal-working rolls, and at least one guide member disposed to present its guiding surface to that portion of the work-piece which is in the pass of said metal-working rolls, said guide member being capable of only limited swinging movement in a plane through the axis of the work-piece to present different longitudinal portions of its guiding surface thereto, the guiding surface of said guide member having a groove of varying diameter which is longitudinally curved on an arc having its focus offset with respect to the axis about which said guide member swings, thereby producing a guide pass of varying size, and means for imparting swinging movement to said guide member, all of said foregoing means being capable of operation during the passage of the work-piece between said metal-working rolls.

BRYANT BANNISTER.